March 21, 1967 L. F. GINNETTE ET AL 3,309,779
DEHYDRATION OF SOLIDS-BEARING LIQUIDS
Filed Feb. 2, 1966
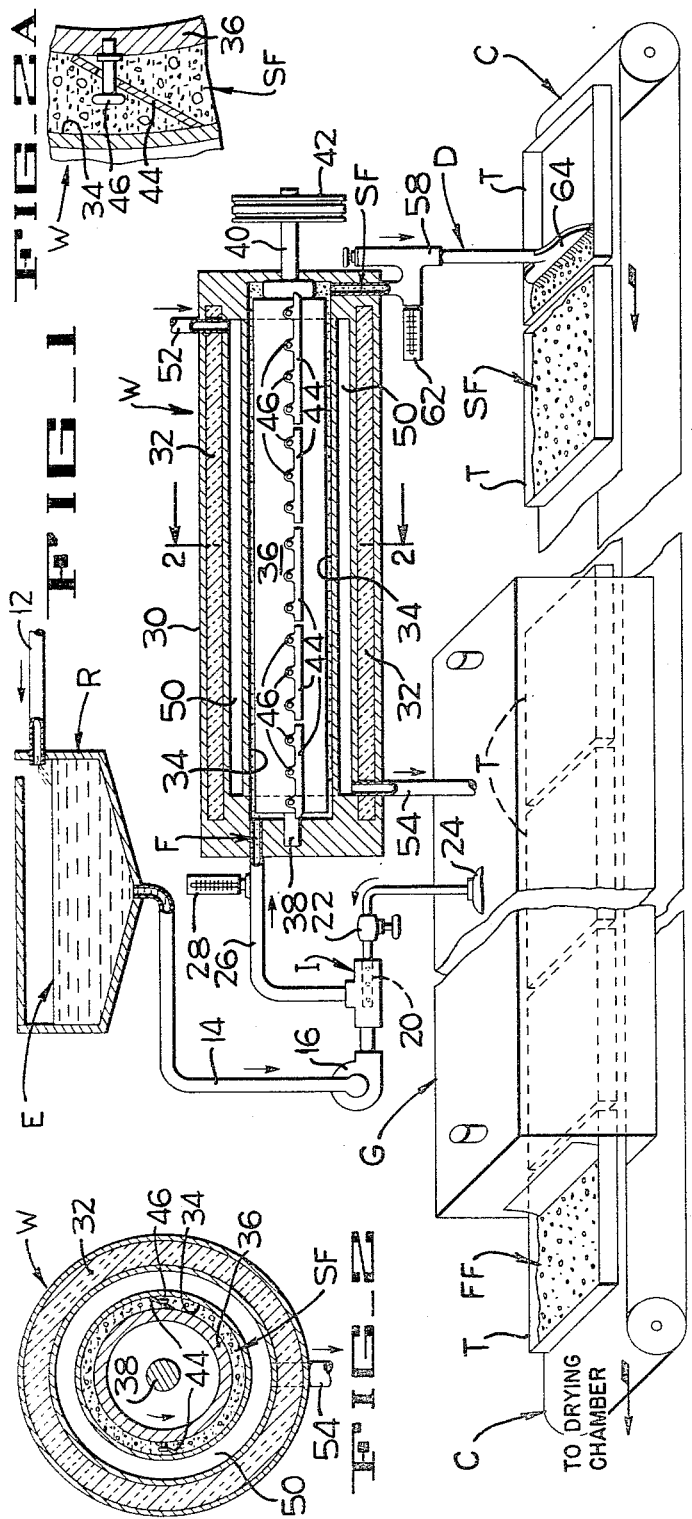
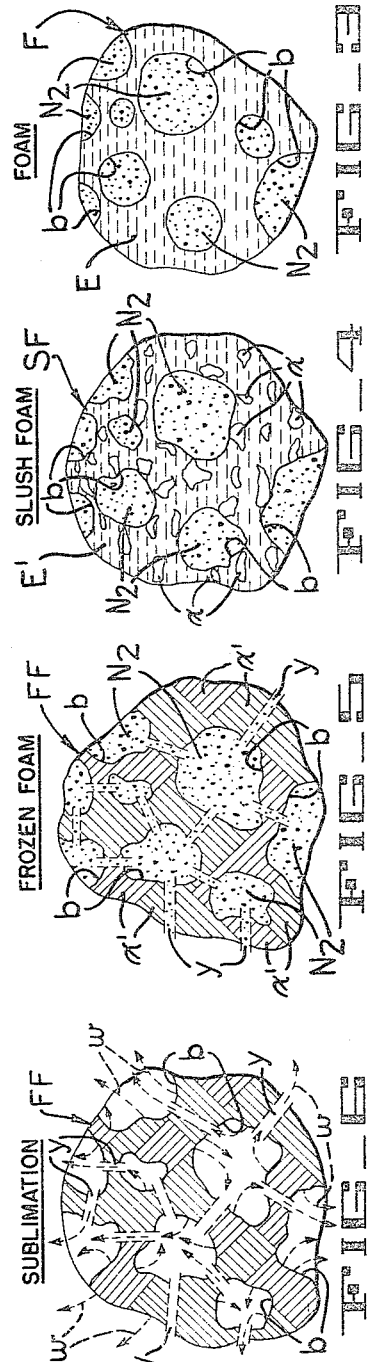
INVENTORS
LEWIS F. GINNETTE
RAUNO A. LAMPI
JOHN A. ABBOTT
BY Francis W. Anderson
ATTORNEY

United States Patent Office 3,309,779
Patented Mar. 21, 1967

3,309,779
DEHYDRATION OF SOLIDS-BEARING LIQUIDS
Lewis F. Ginnette, Cupertino, Rauno A. Lampi, San Jose, and John A. Abbott, Menlo Park, Calif., assignors to FMC Corporation, San Jose, Calif., a corporation of Delaware
Filed Feb. 2, 1966, Ser. No. 524,588
4 Claims. (Cl. 34—5)

This invention relates to the dehydration of solids-bearing liquids and more particularly to the concentration or removal of water from such liquids which include solutions, such as fruit juices, coffee extract, etc.

Industry is often faced with the problem of drying or concentrating certain liquids down to a certain moisture content of substantially zero percent for storage and reconstitution purposes, without heating the liquid as the term "heating" is usually employed. Although in its broader aspects the process of the present invention is useful for a large number of starting materials, the process is particularly useful in the formation of food products such as dried fruit juices, instant coffee powder, etc., and hence the embodiment of the invention to be described in detail will relate to such a starting material, coffee extract.

Coffee extract is a liquid (which will be termed a solution for convenience), that is prepared by extracting soluble solids from roasted coffee to form a concentrated solution containing in the order of from 25 to 30 percent of soluble solids dissolved in water. This extract may have, in addition, a lesser amount of insoluble solids incorporated therein, the presence or absence of which will have no effect on the present invention. The exact nature of the solutes in coffee extract is not known but these extracts contain various carbohydrates, including sugars, in solution, as well as other complex organic substances, which contribute to the flavor and aroma of the coffee extract. From the standpoint of quality, the best method now known for removing the water from coffee extract to produce a powder that is almost 100 percent dry, and which retains substantially all the original aroma and flavor of the fresh extract, is that of sublimation concentration. The sublimation concentration process, commonly known in the food industry as "freeze drying," removes most of the water from the frozen extract or solution at temperatures below 32° F., and completes the drying without raising the temperature of the dried solutes much above room temperature. The resultant powder (instant coffee) is highly soluble, and retains to a high degree the aroma, flavor and other unique and characteristic qualities of the original extract.

Mention has been made of the fact that the process of the present invention can also be used for the preparation of powdered fruit juices. The same considerations outlined above apply to the use of concentrated fruit juice as a starting material, except that the temperature requirements may not be as strict or severe as in the case of the process of forming instant coffee under the present invention.

In freeze drying a frozen product, such as frozen fruit juice or frozen coffee extract, it is essential that consideration be given to the fact that the substance may contain as much as 25 or 30 percent soluble solids. It is also essential that no significant re-liquefaction take place during the sublimation dehydration process, because this degrades the quality of the product and the product becomes plastic and/or frothy and difficult to handle. This has been recognized and hence processes which prepare instant coffee or the like by sublimation concentration or freeze drying have necessarily precluded raising the temperature of the ice in the product to a value higher than about −10° F. If the temperature of the ice rises substantially above this figure, some of the water molecules leaving the ice may condense into and increase the minute amount of concentrated solution necessarily and inherently always present, producing an objectionable fluidity. When the temperature of the ice throughout the product is kept below some practical limiting value, such as −10° F. or lower, then the vapor pressure over the ice is low enough so that sublimation will occur and the vapor can escape from over the ice as fast as it evolves, thereby preventing a rise in vapor pressure with a corresponding increase in the temperature of the ice. In the example given, the maximum preferred ice temperature of −10° F. corresponds to a vapor pressure of water of approximately 560 microns of mercury.

In accordance with the present invention the ice core temperature is readily maintained at −10° F. or lower and yet sufficient heat of sublimation can be applied to the ice core to cause rapid evolution of water vapor and consequent rapid drying of the product without an increase in vapor pressure within the product. This provision of free, relatively unobstructed release of water vapor for flow toward the condensing medium, the vapor ejection device or the like associated with the drying chamber, is a characteristic of the product prepared for freeze drying in accordance with the principles to be described. As will be seen from the following detailed description of an example of an embodiment of the invention, rapid freeze drying of heat-sensitive materials such as frozen coffee extract is accomplished by placing the frozen material in the drying chamber in the form of a frozen foam. This foam, in effect, provides a series of interconnected paths, crevices, cracks or the like throughout the entire frozen body, for the ready evolution and escape of water vapor subliming from the ice cores. The result is that adequate heat can be applied to the ice cores of the product for rapid drying, without causing the vapor pressure of the ice to substantially exceed the aforesaid selected value of about 560 microns, corresponding to an ice temperature of −10° F. Thus all the advantages of freeze drying are attained without the usual disadvantage in drying the products of the type referred to, namely, long drying time, or conversely, the requirement that the heat of sublimation be applied at such a rate that the temperature of the heating medium such as heating shelves or the like remain low, namely, not substantially higher than room temperature. In the present invention the heating shelves or the other medium employed to supply the heating sublimation can be used at a temperature considerably higher than that of room temperature, namely, a temperature in the order of 250° F. without causing wetting, foaming, plasticizing or the like of the produce with the corresponding disadvantages explained above. A detailed description of the process of the present invention as it would be employed in the formation of instant coffee will now be described.

In the drawings:

FIGURE 1 is a schematic diagram of a system for carrying out the process of the present invention except that the apparatus for effecting the final step of the process, namely, the freeze drying or sublimation concentration step, is not illustrated.

FIGURE 2 is a section through the slush forming unit taken along line 2—2 on FIGURE 1.

FIGURE 2A is an enlarged fragmentary section of the slush forming unit showing the mounting of one of the whipping blades.

FIGURE 3 is an enlarged diagram showing, for purposes of explanation only, the appearance of the foamed extract produced in the initial stage of the process.

FIGURE 4 is a diagram like that of FIGURE 3 showing the slush (partially frozen) foam produced in the whipping device of FIGURES 1 and 2.

FIGURE 5 is a diagram like those of FIGURES 3 and 4 showing what is believed to be the physical condition of the completely frozen foam before it is placed in the drying chamber.

FIGURE 6 is a similar diagram showing what is believed to take place in the frozen foam during the sublimation process in the vacuum drying chamber.

Referring to the FIGURES 1, 2 and 2A, apparatus is illustrated diagrammatically for carrying out a continuous process that produces frozen foam for placement in the vacuum drying chamber. In the example to be given the processing of coffee extract E will be described, this being a solution containing approximately 25 to 30 percent of soluble solids, as previously explained. The major units of the system include a reservoir R for the starting material, a gas injector I for producing foam F, an apparatus W for whipping and slush freezing the foam to produce an intermediate material in the form of a slush foam SF, and a dispenser device D for spreading the slush foam SF evenly across a series of trays T being transported by a conveyor C. The trays of slush foam SF are carried through a refrigerated freezing tunnel G, wherein the slush foam is frozen solid to produce a layer of frozen foam FF in the trays. The trays of frozen foam FF are loaded on a shelf cart or the like and introduced into a drying chamber such as that shown in the patent to Abbott et al, 3,132,930 assigned to the assignee of the present invention. The details of the sublimation concentration or freeze drying chamber are not critical to the invention and hence the drying chamber is not shown.

Describing the apparatus in somewhat more detail, the coffee extract E is supplied from the reservoir R, which in turn is supplied by an inlet pipe 12, as required. The extract is delivered by a pipe 14 to a constant displacement pump 16, driven by conventional mechanism (not shown) in a manner to maintain a predetermined flow rate of extract through the system. The pump 16 delivers the extract to the injector I, which is illustrated in the form of a pipe T. One leg of the T receives the extract from the pump 16 and the other leg receives an injector nozzle 20 of conventional design. The nozzle may be nothing more than a closed-end pipe drilled with a plurality of holes, and projecting into the stream of extract supplied from the pump. The injector nozzle 20 connects to a control valve 22 and hence to a source of gas under pressure indicated generally at 24. The gas is relatively inert to the product, it having been found that when forming instant coffee a source of nitrogen gas is preferred, as combining the properties of being inert and not overly expensive. The nitrogen gas flow is regulated relative to the flow of extract E from the pump by means of combined regulation of pump speed and adjustment of the gas valve 22, so that the foam F is produced and pumped into the whipping unit W by means of an inlet pipe 26. The temperature of the incoming foam is measured by a thermometer 28 in the inlet line.

The whipping unit W converts the unfrozen foam F into the partially frozen slush foam SF. This unit, which is shown diagrammatically, includes a thermally jacketed elongated cylindrical housing 30, the thermal insulation material being shown at 32. A cylindrical work chamber 34 is provided, within which a rotor 36 revolves on a stub shaft 38 at one end and a drive shaft 40 at the other end. A rotor drive pulley 42 is connected to a motor (not shown) for rotating the rotor 36. The work chamber between the wall of the chamber 34 and the rotor 36 is traversed by a plurality of blades 44, loosely mounted on the rotor 36 by means of specially headed pins 46, as seen in FIGURE 2A. As the rotor 36 is turned it whips the foam F in the work chamber. In order to convert the foam F to the partially frozen slush foam SF, the work chamber 34 is refrigerated. A refrigeration chamber 50 surrounds the work chamber 34 and has a refrigerant inlet 52 and a refrigerant outlet 54. These pipes are connected to a conventional refrigeration system, which is controlled to produce the necessary rate of refrigeration of the foam as it passes through the whipping unit W.

It is necessary that the nitrogen gas introduced into the foam by the injector I be retained in the foam in the form of a myriad of gas bubbles, the walls of which are illustrated at b in the enlarged diagrammatic views of FIGURES 3 and 4. In order to do this a pressure of about 60 pounds per square inch is maintained in the whipping unit W. This is accomplished by the use of an adjustable back pressure valve 58 forming part of the dispenser unit D. A thermometer 62 is provided at the inlet to the back pressure valve 58 to facilitate temperature control of the slush foam.

The details of the whipping unit W are not critical to the present invention. A continuously operating, closed system heat transfer apparatus suitable for performing the slush freezing operation is manufactured by the Votator Division of Chemetron Corporation, Louisville, Ky., under the trade name "Votator." If desired the extract E could be slush frozen first and then whipped in an ordinary mixer to produce the slush foam. In this case, the mixer bowl would be covered and the gas supplied to the mixer bowl at any zone. The essential feature of this stage in the process is the production of a slush foam SF having partially concentrated liquid, ice crystals and gas bubbles.

Returning to the preferred apparatus for carrying out the process, the slush foam SF, after passing through the back pressure valve 58, flows out of a spreader or dispenser nozzle 64 onto the trays T, as the trays are carried under the nozzle by the conveyor C. In a typical installation wherein the trays are two or three feet in their major dimension the layer of slush foam SF will be in the order of one-half of an inch thick. The details of the manner of spreading the layer of slush foam over the trays T are not critical to the invention. Before the slush foam has an opportunity to melt, it is advanced into the refrigerated freezing tunnel G. Here, in the case of coffee extract, the temperature of the slush foam is lowered from the freezing temperature of 26° F. The time-temperature cycle in the freezing tunnel is such as to freeze the slush foam SF solid and convert it into the frozen foam FF. The trays of frozen foam leaving the freezing tunnel G are then taken to the drying chamber, although if a system of the type used in the aforesaid Abbott et al. patent is employed the trays will first be loaded on a shelf cart or other conveyor unit for simultaneous loading into the drying chamber.

As mentioned, the details of the drying chamber are not critical to the present invention, it only being necessary to understand that heating plates, vapor condenser plates, vapor ejectors, vacuum pumps, or their equivalents are provided for sublimation of the water vapors from the ice in the product and the subsequent removal of the vapors from the vicinity of the ice at a rapid rate. This vapor removal is carried out at a rate adequate to maintain the vapor pressure within the drying chamber at a very low figure, well below that of the triple point. For example, in the process of the present invention, and as applied to the formation of instant coffee the temperature of the ice cores in the frozen product within the drying chamber will be maintained at substantially —10° F., during all but the very terminal portion of the sublimation dehydration cycle. The ambient total gas pressure in the drying chamber may be as low as 100 microns.

The effects of the various steps in the process of the present invention will now be described relative to the diagrams of FIGURES 3–6. However, before this description is presented, a brief résumé of some of the laws operating in sublimation drying of liquid such as fruit juices, coffee extract and the like will be presented, insofar as they are pertinent to an understanding of the present invention. Using a sugar solution by a way of example (and a sugar solution acts similarly to the coffee extract and fruit juices) as the percentage of soluble solids of the solution increases, the freezing temperature of the solution is lowered. Assume, now, that the solution is being brought to a certain temperature, such as −10° F., which is well below the freezing point of water. As the temperature is lowered, and assuming that the special conditions of super cooling do not occur, the solution begins to freeze at below 32° F. and ice crystals form. The lower the temperature the greater the percentage of ice crystals and the less percentage of water remaining in the solution. In the case of a sugar solution which contained 25% of soluble solids, initially, ice crystals would begin to form at 28–29° F. By the time the solution had been cooled to 15° F., for example, sufficient ice crystals would be formed to increase the solids concentration of the remaining solution to 55%. At this point, some 70% of the water would have been converted to ice. Further cooling would produce more ice crystals, higher concentration of solids in the remaining solution, and possibly crystals of solid phases other than ice. At −10° F. the gross appearance will be that of a solidly frozen mass.

However, within the practical operating range this solid frozen material can be considered to contain small or microscopic groups of molecules of highly concentrated solution, that is, small bodies of soluble solids (such as the sugar being referred to) which are bound to a small amount of water. The pressure of water vapor over ice at −10° F. is 560 microns (0.560 mm. Hg). As the aforesaid freezing of the solution took place, molecules of water vapor released from the solution crystalized directly into ice. Of course, some molecules of water vapor tend to leave the surface of the ice and re-enter the solution, but as the temperature is lowered the process is predominantly one of crystalization of the water from the solution. If the substantially solid frozen product is maintained at the terminal temperature of −10° F., a steady state condition exists. The molecules of water vapor over the concentrated solution and over the ice will be in equilibrium, and for every molecule of water vapor leaving the ice and recombining with a water molecule in the concentrated solution there will be a water molecule leaving the solution and crystalizing into the ice cores.

In order to dry the aforesaid frozen mass by sublimation in a commercially feasible process, the heat of sublimation must be added to the frozen product. When heat is added to this product, huge volumes of water vapor are evolved providing the ambient pressure in the drying chamber is low, for example, providing it is at the usual preferred operating pressure of these units, which is in the range of 100 to 200 microns or the like. If the water molecules subliming from the ice cores are removed from the vicinity of the ice cores as fast as they are produced (by maintaining the aforesaid low ambient pressure in the drying chamber), no problems are presented. The molecules so leaving the ice cores will preferentially gravitate or flow toward the condensing or other vapor removing means, rather than toward the adjacent bodies of highly concentrated liquid, for reliquefaction.

However, if a tray of the solution is frozen solid to a ¼ inch thick, as is typical in using freeze dryers, and this tray is placed in the drying chamber, although the action just described takes place at the surface of the frozen product, the action is inhibited in the internal zones of the product. Here molecules of water vapor cannot freely escape. Any restriction of the free removal of these sublimed water vapor molecules results in an increase in the temperature of the ice core resulting from an increase in the vapor pressure thereover.

It is a phenomenon of highly concentrated solutions that under the conditions just described, the vapor pressure of these solutions increases as their temperature increases, but not as rapidly as the vapor pressure of a body of pure ice adjacent thereto. Thus, if there is confinement (or partial confinement) of the water vapor molecules subliming from the ice cores the differential pressure or driving force acting on the molecules leaving the ice core could be in the direction tending to cause the water vapor molecules from the ice to condense in the highly concentrated liquid (which as stated is now at a lower vapor pressure than that of the ice core) instead of escaping to the condenser or other vacuum creating unit, thereby producing the objectionable reliquefaction already described. These conditions can exist within the conventional solid quarter inch body of frozen product just described. The result of these conditions is that the heat of sublimation can only be applied to the frozen product at a rate which will insure that no such reliquefaction occurs. If reliquefaction is permitted to occur, in the case of coffee extract, for example, the latter is converted into a plastic tar-like mass which is difficult to handle and which becomes relatively more fluid as the ice sublimes. Thus, ideally, the rapid and economical sublimation dehydration of the coffee extract being described would require the use of exceedingly large areas of thin layers of frozen extract. These would present costly mechanical problems, or the alternative is that the drying time must be long. Also, very thin layers are difficult to produce in a uniform and controlled manner. Hence, toward the end of the drying cycle, scorching is difficult to prevent. The manner in which the process of the present invention overcomes these disadvantages will now be explained.

FIGURE 3 is an enlarged idealized fragmentary section of a portion of the coffee extract E after it has been converted into the foam F at the injector I. Here bubbles of nitrogen gas $N_2$ have been injected into the extract. These bubbles can be considered to be bounded by walls $b$ of the coffee extract solution E.

As the foam F passes through the whipping device W, it is subjected to a freezing temperature, which, in the case of coffee extract, will be approximately 26° F., or with fruit juices 15° F. In either case, the slush foam SF leaving the whipping device can be considered to have a structure resembling that of the diagram of FIGURE 4. Here the bubbles containing hydrogen gas remain as discrete pockets of gas surrounded by the walls $b$. However, the coffee extract solution is more concentrated, and is now indicated as E′. The reason that the solution is more concentrated is that during a slush freezing operation, ice crystals $x$ crystallized out from the solution E as pure ice, with the resulting increase in the percentage of soluble solids in the liquid E′. This slush foam SF is readily handled by the dispenser D, as previously described.

When the slush foam SF enters the refrigerated freezing tunnel G, freezing of the liquid E′ is substantially completed resulting in a solid mass of ice crystals $x'$. However, and as previously explained, within practical temperature range it is not possible to completely solidify or crystalize all of the soluble solids. There will be a very slight amount of water bound to some of the soluble solids and hence, although the frozen foam FF of FIGURE 5 can be considered to contain solid ice $x'$, this ice is itself made up of small particles of pure frozen water and small (probably ultra-microscopically small) bodies of molecule groups of very highly concentrated solution. This sets up the conditions previously described which are presented when freeze drying or sublimation dehydration of a frozen body of this material is to be effected.

However, in the present invention, the frozen foam FF is not a solid body of ice crystals and concentrated solution $x'$. It includes the voids formed by the bubbles of nitrogen gas $N_2$, with the balls $b$ of the bubbles now being ice walls. The nitrogen gas in the frozen foam FF is not trapped in these voids and can now escape. The material acts as an open cell sponge. Small gas passageways, idealized at y in FIGURE 5, are produced which passageways interconnect the voids formed by the gas bubbles and hence provide relatively unobstructed paths or channels for gases in the bubbles to escape to the surface of the product. The small passages y are shown, for purposes of illustration, as relatively large channels bounded by dotted lines. The nature of these passages is not exactly known; there are probably a great number of them at each void, but in any case the effect of the process is that which would take place if interconnecting channels such as those shown at y were provided.

When the frozen foam FF (in the trays) is placed in the freeze drying chamber, sublimation takes place as shown in FIGURE 6. The sublimation action becomes of particular significance as soon as the heat is supplied to the frozen mass. Assuming that the temperature of the frozen product is maintained at −10° F. in the freeze drying chamber the pressure of the water vapor over the ice bodies $x'$ will be about 560 microns. This is considerably higher than the pressure of 100 to 200 microns at the vapor removal or condensing zones of the chamber, so that the molecules of the water vapor, indicated by the small-arrows $w$ in the mass flow of FIGURE 6, will tend to be towards the condensing zones. This flow is greatly facilitated by the small interconnecting passages $y$, previously described, so that there is substantially little effective confinement of the water vapor molecules subliming from the ice cores. Thus, the partial pressure of water vapor over the ice cores does not rise to any significant degree. So long as the vacuum-creating mechanism on the freeze drying unit is in effective operation, the temperature of the ice cores will not rise significantly. These conditions all cooperate to preclude any significant recombining of water vapor molecules subliming from the ice cores with any bodies of highly concentrated solution remaining in the soluble solid portion of the mass. In fact, these micro-molecular bodies of concentrated solution will themselves eventually evaporate water molecules. Thus, adequate heat can be applied to the frozen foam FF so that sublimation drying takes place within a commercially acceptable time. The result as to drying is the same as if a layer of frozen extract E had been loaded into the freeze drying unit in a form of a micro-thin frozen film, to provide a large area for release of sublimed water vapor. However, such a layer could not be handled in practice. Actually, the layer of frozen foam FF can, as previously mentioned, be easily as much as one-half of an inch thick, which prevents scorching and makes the process practical.

When the layer of frozen foam FF is completely dehydrated (except for a small percentage of moisture, such as one percent, for example) there is no shrinkage of this layer. This indicates excellent quality retention in the dried product. The resultant product will be commercially dry. It will be a highly frangible, spongy and fluffy mass. This mass, which will remain at its original thickness of one-half of an inch in the trays, can be broken down into fine granules of instant coffee with the application nothing but the lightest crushing forces.

To re-capitulate, since there is no substantial increase in temperature of the liquid and ice core bodies during the drying process, there is no differential increase in vapor pressure of the ice over that of the very small remaining body of highly concentrated liquid in the soluble solid content. Thus, there is no transfer of water molecules from the ice bodies to the highly concentrated minute elements of solution remaining in the mass, so that the said mass, instead of becoming wetter, remains dry or becomes drier, which is exactly what is required for a successful operation of the process.

The production of the foam F and of the slush foam SF is a simple, commercial technique which can be performed with equipment readily available to the trade. It is a rapid technique that lends itself to continuous processing, and the slush foam SF is also easily handled and spread for the final step of sublimation concentration in the drying chamber. Thus, the process of the present invention makes possible drying, for example, of the layers of products one-half inch thick in their trays to produce the fluffy, frangible, porous instant coffee material previously described at relatively short drying times, when the sensitive nature of the starting material is considered. As previously mentioned, the invention is not limited to the formation of instant coffee from coffee extract but can also be used for the formation of sublimation-dried fruit juices or the like, wherein the storage properties of frozen materials are sought and wherein the freezing process itself does not damage the product.

The nature of the gas used for foaming is determined by the properties of the product. In the appended claims, the term "inert" as applied to the gas is used in the sense that the gas is inert to the product, insofar as deleterious reactions with the product is concerned.

Having completed a detailed explanation of the invention so that those skilled in the art may practice the same, we claim:

1. A process for dehydrating solutions or the like comprising the steps of introducing an inert gas into the solution and whipping the solution to produce a foam; abstracting heat from the foam during whipping to produce a slush foam that comprises a conglomeration of concentrated solution, ice crystals and gas bubbles; abstracting heat from the slush foam until the solvent in the foam is substantially completely frozen to produce a frozen foam that encompasses a network of voids corresponding to the gas bubbles; placing the frozen foam in a vacuum drying chamber; and adding the heat of sublimation to the ice in the frozen foam while maintaining the total gas and water vapor pressure over the ice content, throughout substantially the entire ice structure, low enough to prevent water vapor molecules sublimed from the ice from remixing with the substantially dry solids content of the product.

2. A continuous process for dehydrating solutions or the like comprising the steps of pumping a stream of the solution, introducing an inert gas into the solution to produce a foam; partially confining and whipping the foam in a continuous stream; abstracting heat from the foam during whipping to produce a slush foam that comprises a conglomeration of concentrated solution, ice crystals and gas bubbles; continuously spreading the slush foam into a layer on a flat surface; abstracting heat from the layer of slush foam until the solvent in the foam is substantially completely frozen to produce a frozen foam that encompasses a network of voids corresponding to the gas bubbles; placing the frozen foam in a vacuum drying chamber; and adding the heat of sublimation to the ice in the frozen foam while maintaining the total gas and water vapor pressure over the ice content, throughout substantially the entire ice layer, low enough to prevent water vapor molecules sublimed from the ice from remixing with the substantially dry solids content of the product.

3. The process of claim 2, wherein the gas is introduced into the solution stream before the solution is whipped.

4. The process of claim 2, wherein the temperature of the frozen foam is substantially lower than that of the slush foam.

References Cited by the Examiner

UNITED STATES PATENTS 3,132,930   5/1964   Abbott _____ 34—5
3,170,803   2/1965   Morgan _____ 99—106

(Other references on following page)

References Cited by the Applicant

UNITED STATES PATENTS

| | | |
|---|---|---|
| 2,509,681 | 5/1950 | Flosdorf. |
| 2,785,077 | 3/1957 | Kaufman. |
| 2,914,411 | 11/1959 | Toulmin. |
| 2,967,109 | 1/1961 | Morgan et al. |
| 3,009,818 | 11/1961 | Jokay et al. |
| 3,044,878 | 7/1962 | Knedlik. |
| 3,170,803 | 2/1965 | Morgan. |

WILLIAM J. WYE, *Primary Examiner.*